US008027756B2

(12) United States Patent
Davis et al.

(10) Patent No.: US 8,027,756 B2
(45) Date of Patent: Sep. 27, 2011

(54) INTEGRATED APPROACH NAVIGATION SYSTEM, METHOD, AND COMPUTER PROGRAM PRODUCT

(75) Inventors: Robert B. Davis, Mill Creek, WA (US); Daniel J. Boorman, Woodinville, WA (US); L. Kirk Gagnon, Bothell, WA (US); William L. Goodman, Coupeville, WA (US); Alan R. Jacobsen, Renton, WA (US); William A. Miller, Arlington, WA (US); James E. Mitchell, Renton, WA (US); Victor A. Riley, Point Roberts, WA (US); William F. Royce, Kirkland, WA (US); William D. Tafs, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1293 days.

(21) Appl. No.: 11/608,064

(22) Filed: Dec. 7, 2006

(65) Prior Publication Data
US 2008/0140270 A1 Jun. 12, 2008

(51) Int. Cl.
*G05D 1/06* (2006.01)
(52) U.S. Cl. ........... 701/8; 701/3; 701/5; 701/9; 701/14; 701/16; 701/200; 701/205
(58) Field of Classification Search .................. 701/3, 5, 701/8, 9, 14, 16, 200, 205; 340/974, 973, 340/977, 990
See application file for complete search history.

(56) References Cited

U.S. PATENT DOCUMENTS

| | | | | |
|---|---|---|---|---|
| 4,368,517 A * | 1/1983 | Lovering | | 701/16 |
| 5,289,185 A * | 2/1994 | Ramier et al. | | 340/971 |
| 5,719,567 A * | 2/1998 | Norris | | 340/953 |
| 5,745,863 A * | 4/1998 | Uhlenhop et al. | | 701/14 |
| 6,320,579 B1 * | 11/2001 | Snyder et al. | | 345/419 |
| 6,571,155 B2 * | 5/2003 | Carriker et al. | | 701/3 |
| 6,711,479 B1 * | 3/2004 | Staggs | | 701/16 |
| 6,812,858 B2 * | 11/2004 | Griffin, III | | 340/945 |
| 6,885,313 B2 * | 4/2005 | Selk et al. | | 340/945 |
| 7,046,170 B2 * | 5/2006 | Naimer et al. | | 340/945 |
| 7,237,747 B1 * | 7/2007 | Baudry | | 244/76 R |
| 2003/0004619 A1 * | 1/2003 | Carriker et al. | | 701/3 |
| 2003/0034901 A1 * | 2/2003 | Griffin, III | | 340/945 |

(Continued)

OTHER PUBLICATIONS

AERO Boeing No. 22 ; Second-Quater—April.*

(Continued)

*Primary Examiner* — Khoi Tran
*Assistant Examiner* — Jorge Peche
(74) *Attorney, Agent, or Firm* — Alston & Bird LLP

(57) ABSTRACT

Systems, computer program products, and methods for displaying navigation performance based flight path deviation information during the final approach segment to a runway and during landing of non-precision flight modes are provided. Improved graphical depictions of navigation performance based flight path deviation information provide pilots and flight crew members with clear, concise displays of the dynamic relationship between ANP and RNP, mode and aspect of flight and related procedures, intersecting flight paths, and current actual flight path deviation from a predefined flight path during the final approach segment to a runway and during landing. For example, an enhanced IAN display may include NPS-type deviation scales to show RNP/ANP relationships and predetermined RNP markers to alert the pilots and flight crew members that the FMC has transitioned from an NPS display for RNAV (LNAV/VNAV) flight procedures to an enhanced IAN display for a non-precision (non-xLS) approach and/or landing.

16 Claims, 8 Drawing Sheets

U.S. PATENT DOCUMENTS

2004/0189492 A1* 9/2004 Selk et al. .................. 340/973
2005/0057376 A1* 3/2005 Naimer et al. ............... 340/973
2007/0145183 A1* 6/2007 Baudry ...................... 244/76 R

OTHER PUBLICATIONS

*Instrument Approach*, available at http://en.wikipedia.org/wiki/Instrument_approach (Oct. 26, 2006), 3 pages.
*Flight Management System*, available at http://en.wikipedia.org/wiki/Flight_Management_Computer (Oct. 26, 2006), 2 pages.
*A Blended Approach to Congestion*, available at http://cat.texterity.com/cat/2005-4/templates/pageviewer_print?pg=14&pm=5 (Oct. 26, 2006), 5 pages.
Aero Magazine—Issue 12, available at http://www.boeing.com/commercial/aeromagazine/aero_12/ (Oct. 25, 2006), 16 pages.
Aero Magazine—Issue 16, available at http://www.boeing.com/commercial/aeromagazine/aero_16/ (Oct. 25, 2006), 13 pages.
Aero Magazine—Issue 21, available at http://www.boeing.com/commercial/aeromagazine/aero_21/ (Oct. 25, 2006), 17 pages.
Aero Magazine—Issue 22, available at http://www.boeing.com/commercial/aeromagazine/aero_22/ (Oct. 25, 2006), 11 pages.
*Aero 22—New Navigation Approach Options complement*, available at http://www.boeing.com/commercial/aeromagazine/aero_22/approach_nmewnay.html (Oct. 24, 2006), 2 pages.
*Aero 22—New Approach Navigation Option Displays and Procedures Dovetail With Current and Emerg . . .* , available at http://www.boeing.com/commercial/aeromagazine/aero_22/approach_displays.html (Oct. 24, 2006), 7 pages.

* cited by examiner

INTEGRATED APPROACH NAVIGATION SYSTEM, METHOD, AND COMPUTER PROGRAM PRODUCT

FIELD OF THE INVENTION

The present invention relates generally to flight path information systems, and, more particularly, to flight path information assemblies, methods, and computer program products for displaying flight path deviation information based on navigation system performance.

BACKGROUND OF THE INVENTION

In modern commercial aircraft, if not already available electronically, a flight crew makes flight plan entries and modifications through a Flight Management System—Control Display Unit (FMS-CDU). The FMS-CDU is an electronic module containing a keyboard on its lower face half and an electronic display on its upper face half. By keying entries into the keyboard, the flight crew can build or modify a route into the Flight Management Computer (FMC) by typing in a series of waypoints which are then displayed, in text form, on the upper half of the FMS-CDU display.

An additionally provided display is a navigation (map) display. In contrast to the text display of the FMS-CDU, the navigation display graphically depicts the selected waypoints along a desired route. Thus, as the flight crew types entries into the FMS-CDU, these are then displayed graphically on the navigation display.

Current FMCs provide for construction of a variety of flight plans, consisting of point-to-point leg segments and procedural maneuvers. In addition, conventional FMCs provide an autopilot mode where the aircraft automatically flies according to a predefined flight plan by providing lateral navigation (LNAV) and vertical navigation (VNAV) guidance so that the route can be flown. Most commercial airliners can be flown on a constant heading with the autopilot engaged. This allows interception and tracking of a course outbound from a geographical waypoint. However, due to the effect of wind on the airplane's flight path and other factors, the actual heading flown by the aircraft often differs from the predefined flight plan, thus requiring constant adjustment to the airplane heading to maintain the desired course.

In order to facilitate adjustment of the airplane heading to maintain the desired course, many conventional FMCs are also capable of determining the position of the aircraft from navigation systems, such as GPS (Global Positioning System), ILS (Instrument Landing System), IRS (Inertial Reference System), VOR (VHF Omni-directional radio Range) and DME (Distance Measuring Equipment). While these sources can provide adequate positioning information, they each have individual drawbacks. For example, while systems such as GPS systems, which acquire positioning information from satellites, can provide positioning information to an aircraft virtually anywhere, the availability of such satellite-based systems can be limited due to factors such as satellite geometry. And while ILS-type systems provide very accurate positioning information, these types of systems are ground-based systems and are limited to landing procedures at major airports.

Due to the variances in the accuracy of many navigation systems, the United States and international aviation communities have adopted the Required Navigation Performance (RNP) process for defining aircraft performance when operating in en-route, approach, and landing phases of flight. RNP relates to the navigation capability of the aircraft. RNP is a probabilistic approach to evaluating an aircraft's deviation from its intended course, and has been defined by the International Civil Aviation Organization (ICAO) as "a statement of the navigation performance accuracy necessary for operation within a defined airspace." Currently, several definitions of RNP standards exist, including Boeing RNP, Airbus RNP, RNP-10, and BRNAV/RNP-5. In this regard, according to the Boeing RNP, the navigation performance accuracy can be quantified by a distance in nautical miles, and a probability level of 95% laterally and 99.7% vertically. For example, an aircraft is qualified to operate in an RNP 1 nm lateral, RNP 250 feet vertical airspace if it can demonstrate that the capability and performance of the aircraft's navigation system will result in the aircraft being within 1 nm (nautical mile) lateral of the indicated position on the navigation system at least 95% of the flying time, and within 250 feet vertical of the indicated position at least 99.7% of the flying time.

Expanding upon the lateral navigation accuracy performance standard of 95%, the Boeing RNP defines a lateral integrity containment limit of twice the size of the RNP, centered on the aircraft's predefined path. The integrity containment limit further specifies that the navigation system must ensure the aircraft remains within the integrity containment boundary 99.999% of the flying time.

To determine whether an aircraft is within the RNP or integrity containment limit, FMCs calculate a real-time estimate of the navigation system accuracy, commonly referred to as the Actual Navigation Performance (ANP). ANP represents a measure of uncertainty of position. The ANP is typically calculated by the FMC based upon fault-free performance and integrity statistics provided by the GPS receivers or the aircraft's geometry relative to ground-based navigation aids, and assumptions on the navigation aid survey location error and performance characteristics. The ANP and RNP are then typically displayed on the FMS-CDU in numeric form along with a large amount of other numeric and text information relating to the intended flight path of the airplane. In order to determine whether the ANP is within the RNP, the FMC compares the RNP and ANP values and then sends an annunciation to the display system providing for an "UNABLE RNP" alert when ANP exceeds RNP. This alert does not directly account for RNP changes due to the airplane deviating from the defined path. To account for this, the pilot or other crew member must look at the lateral path deviation displayed on the aircraft Navigation Display and the altitude displayed on the aircraft Primary Flight Display and attempt to determine if the deviation is acceptable for the selected RNP. This display and comparison method of determining whether the ANP is within the RNP requires an unnecessary amount of time, can be very distracting for the pilot and/or air crew member, and is only marginally adequate for low RNP values.

To improve on the ability of a pilot or other crew member to evaluate the RNP and ANP data, prior developments have been made to provide a display depicting navigation performance-based flight path deviation information for use at altitude, also referred to as a Navigation Performance Scale (NPS), an NPS scale, or an ANP-RNP bar. An NPS display refers to a navigation display generated by the FMC for displaying LNAV and VNAV deviations. Such displays are described in U.S. Pat. No. 6,571,155 to Carriker et al., the content of which is hereby incorporated by reference in its entirety. However, NPS scales are only used before final approach procedures. Rather than an NPS display, an ILS or IAN (Integrated Approach Navigation) display is provided upon the final approach segment to a runway during landing procedures. The IAN display is generated by the FMC and supports ILS-like procedures, display features, and autopilot controls for non-precision (non-xLS) approaches. When a precision (xLS) ILS approach is defined and available for a runway, an ILS display is preferred over an IAN display. When ILS is not available, an IAN display is used for non-precision approaches. Unlike NPS displays, IAN displays do not provide deviation scales that depict the relationship between RNP and ANP. The pilot or other crew member must correlate the displayed lateral and vertical path deviations with the numeric RNP and ANP readouts to determine the relationship between RNP and ANP and the lateral and vertical path deviations. This display and comparison method for the final approach segment and landing requires an unnecessary amount of time, can be very distracting for the pilot and/or air crew member, and is inconsistent with flight displays during LNAV/VNAV procedures.

SUMMARY OF THE INVENTION

In light of the foregoing background, the present invention provides systems, computer program products, and methods for displaying navigation performance based flight path deviation information during the final approach segment to a runway and during landing for non-precision flight modes and procedures. Embodiments of the present invention also improve upon the graphical depiction of navigation performance based flight path deviation information. Embodiments of the present invention provide pilots and/or air crew members with a clear, concise display of the dynamic relationship between ANP and RNP, mode and aspect of flight and related procedures, intersecting flight paths, and current actual flight path deviation from a predefined flight path during the final approach segment to a runway and during landing. Also, whereas ILS guidance systems are generally limited to precision (xLS) landing procedures at major airports, embodiments of systems, computer program products, and methods of the present invention provide a deviation display operable for a wider range of airport procedures, including the final non-precision (non-xLS) approach segments to runways and during non-precision (non-xLS) landings. Embodiments of the present invention may further reduce crew workload, standardize crew procedures, and enhance flight safety.

According to one embodiment of the present invention, an integrated flight deck display system for an aircraft includes a display screen, a flight management computer (FMC) configured to generate graphic presentations for the display screen, and an autopilot flight director system for performing autopilot flight control procedures. The graphic presentations include displays for non-approach, non-landing flight modes, non-precision approach flight modes, and non-precision landing flight modes. The generated graphic presentations for the displays include at least one flight path scale comprising a reference point bounded by end markers extending in at least one of a lateral and vertical direction, such as the end markers extending equidistant laterally and/or vertically from the reference point on a respective flight path scale. The reference point relates to an actual flight path, and the end markers represent a required navigation performance (RNP). The display may also include at least one moveable deviation pointer disposed on the flight path scales, where the deviation pointer moves between the end markers based upon a deviation of the actual flight path of the aircraft relative to a predefined flight path. Additionally, the generated graphic presentations for the displays include a representation of at least one extendable navigation uncertainty bar disposed on the flight path scale. The representation extends from at least one of the end markers toward the reference point based upon the actual navigation performance (ANP) and the RNP for the aircraft, where the RNP is based upon a flight phase of the aircraft.

In operation, according to another embodiment of the present invention, a method for providing navigation performance flight path deviation information for an aircraft begins by providing a flight display during non-precision, non-approach, non-landing flight modes. The method also provides an attitude director indicator on the flight display. And the method provides flight path scales for the display. The flight path scales are presented in semi-transparent shadow boxes on top of the attitude director indicator. Then, a deviation of the actual flight path of the aircraft relative to a predefined flight path is determined, and the moveable deviation pointers are thereafter displayed on the flight path scales based upon the deviation and the reference point. Next, the actual navigation performance (ANP) and the RNP are determined based upon a flight phase of the aircraft, and a representation of at least one extendable navigation uncertainty is thereafter displayed on the flight path scales based upon the ANP and RNP. The representation of an extendable navigation uncertainty bar may begin at a position further than at least one of the end markers from the reference point and then extend toward the reference point of the flight path scale. And the representation of the extendable navigation uncertainty bar may be graphically presented as being positioned behind the end markers. In a further embodiment, deviation pointers on the representation are identified. In embodiments including the intersecting flight path pointers, after displaying the representation, at least one intersecting flight path is identified, and the moveable intersecting flight path pointers are thereafter displayed on the flight path scales based upon a distance of the intersecting flight path from the actual flight path.

The various embodiments of the present invention therefore provide pilots and/or air crew members with a clear, concise display of the ANP as it relates to the RNP, intersecting flight paths, and current actual flight path deviation from a predefined flight path for non-approach, non-landing flight modes, non-precision approach flight modes, and non-precision landing flight modes. The non-distracting and intuitive display of the present invention also allows pilots and/or air crew members to readily determine in a timely manner whether the current navigation performance of the aircraft is within the required navigation performance.

These characteristics, as well as additional details, of embodiments of the present invention are further described herein. Additional exemplary embodiments of the present invention provide associated systems, methods, and computer program products representative of the characteristics described above.

BRIEF DESCRIPTION OF THE DRAWINGS

Figure 1:
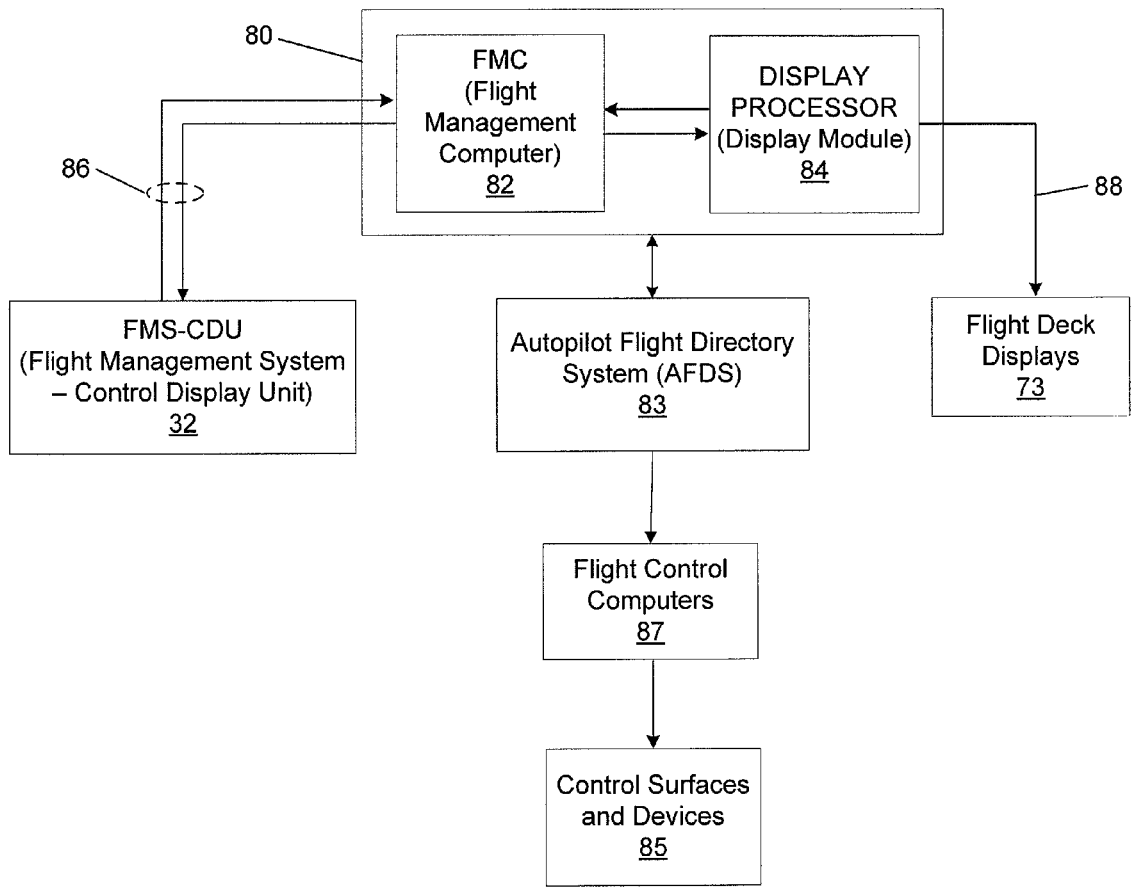
Figure 2:
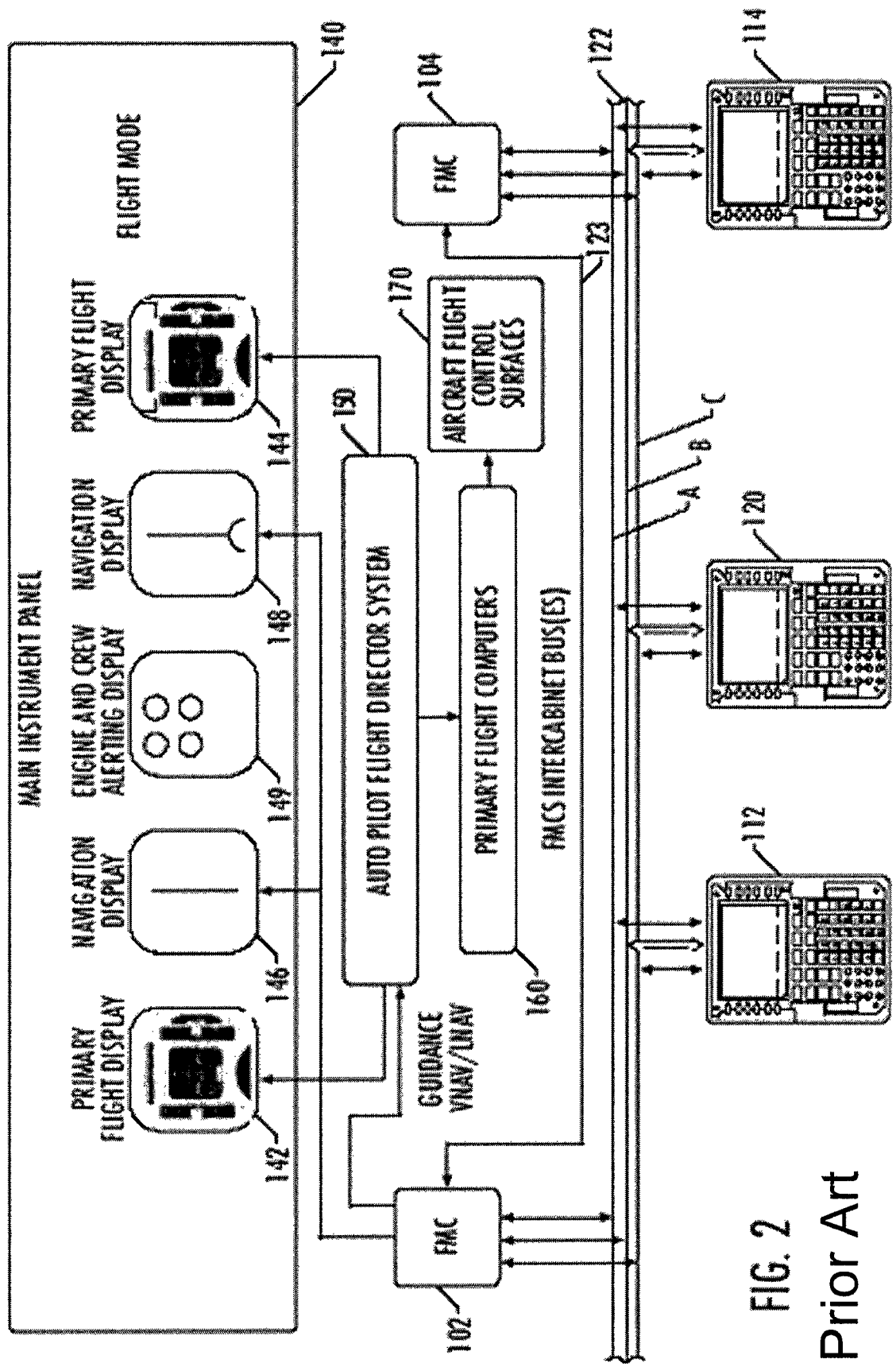
Figure 3:
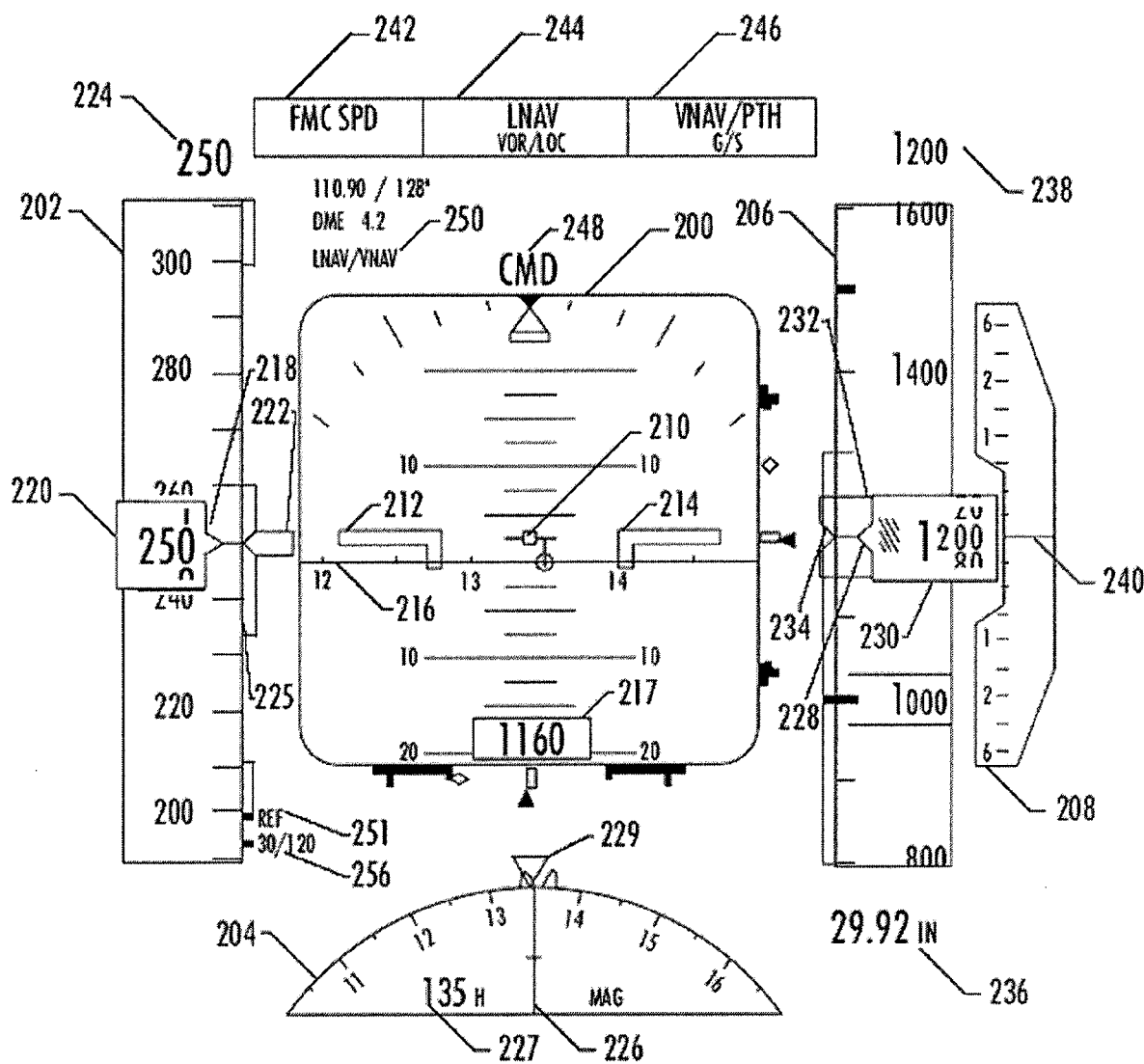
Figure 4:
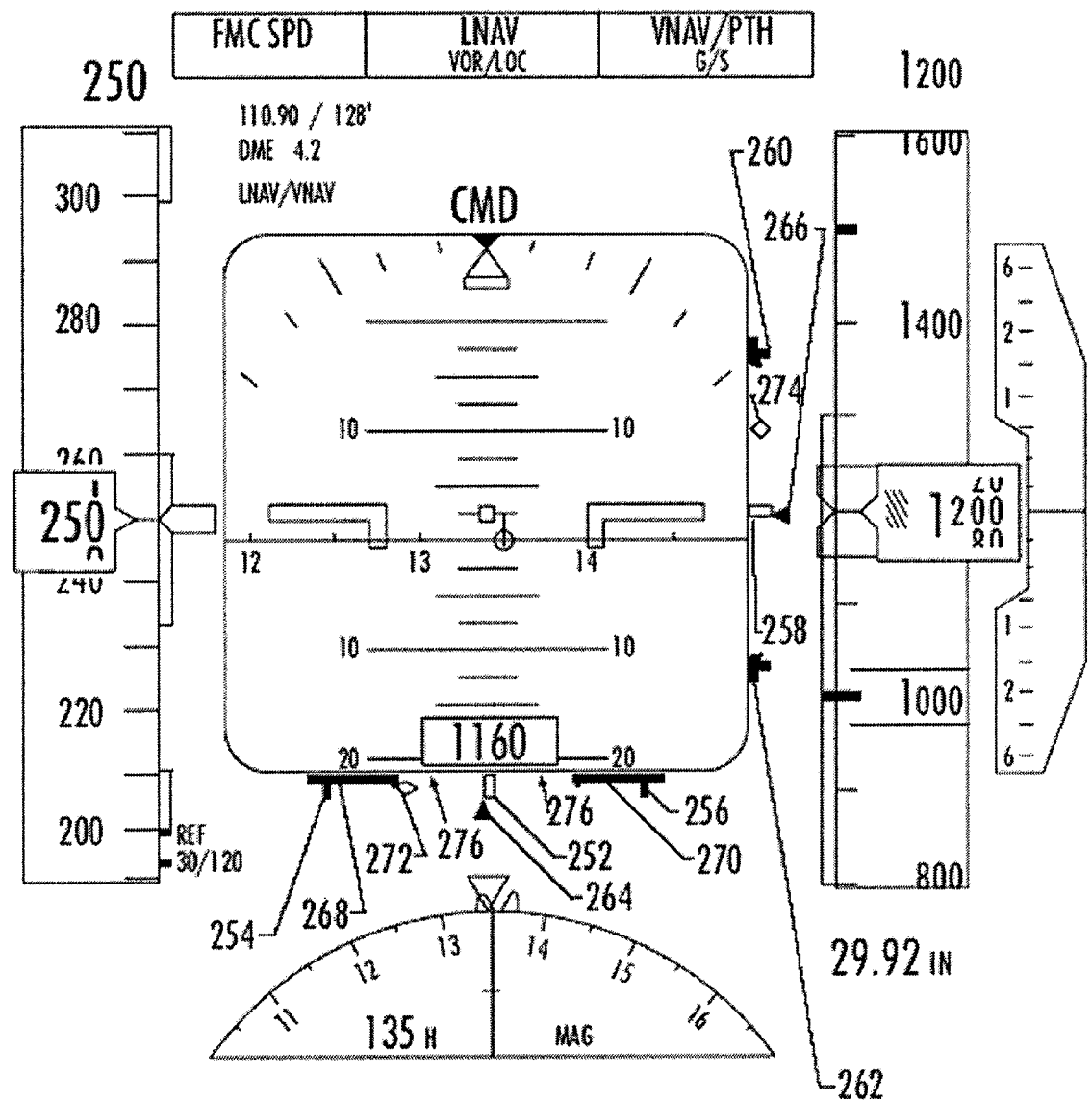
Figure 5:
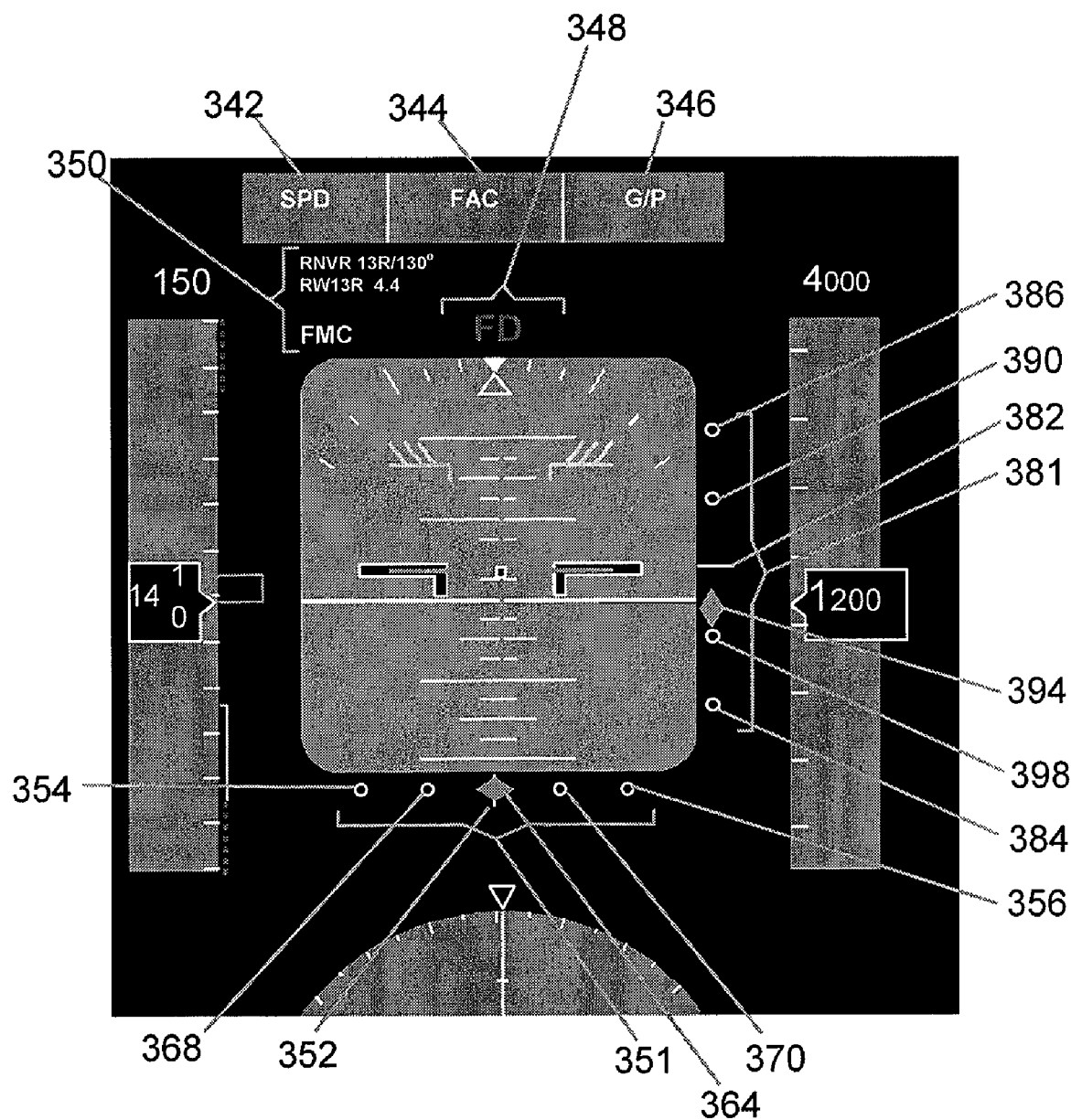
Figure 6:
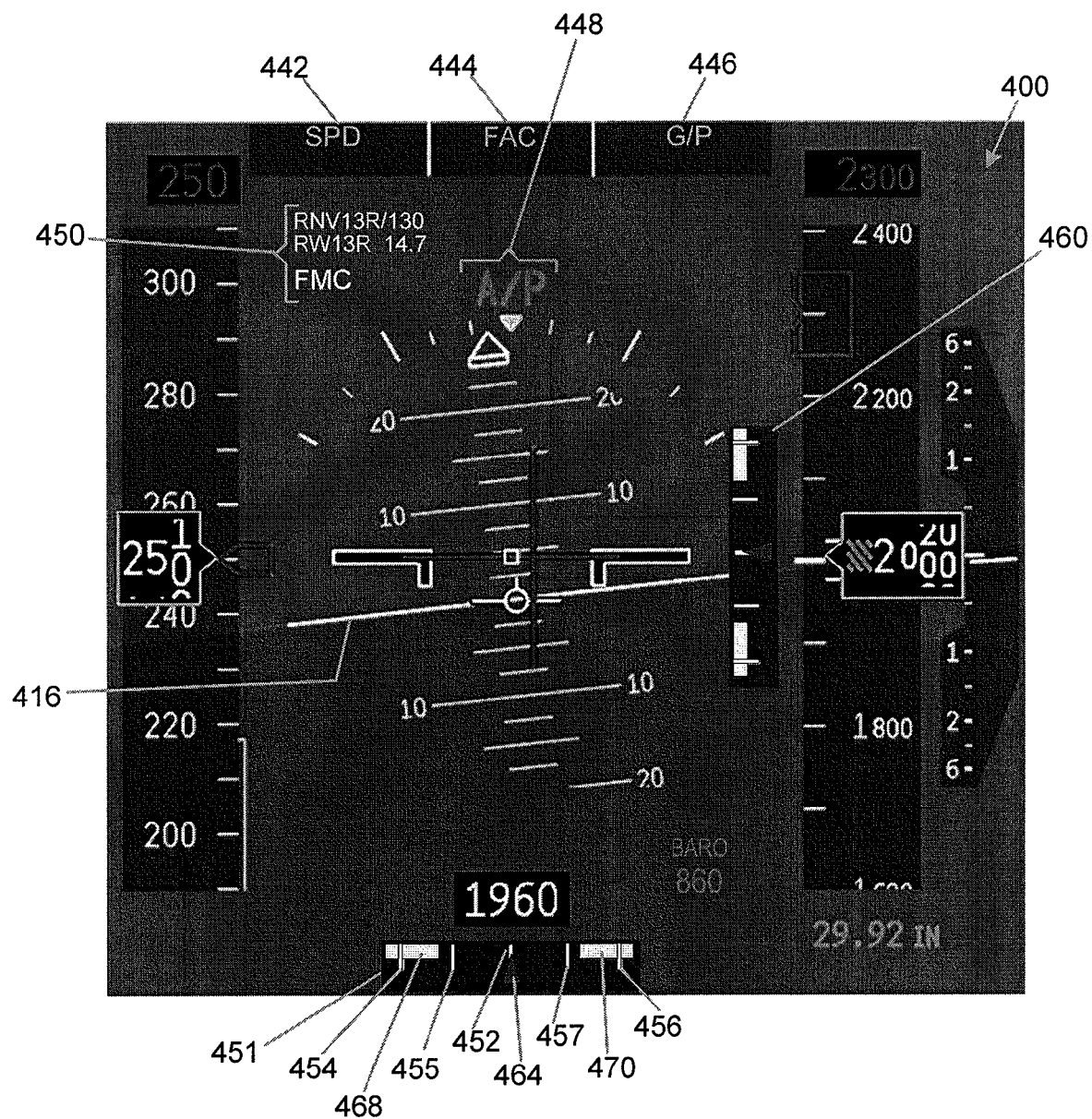
Figure 7:
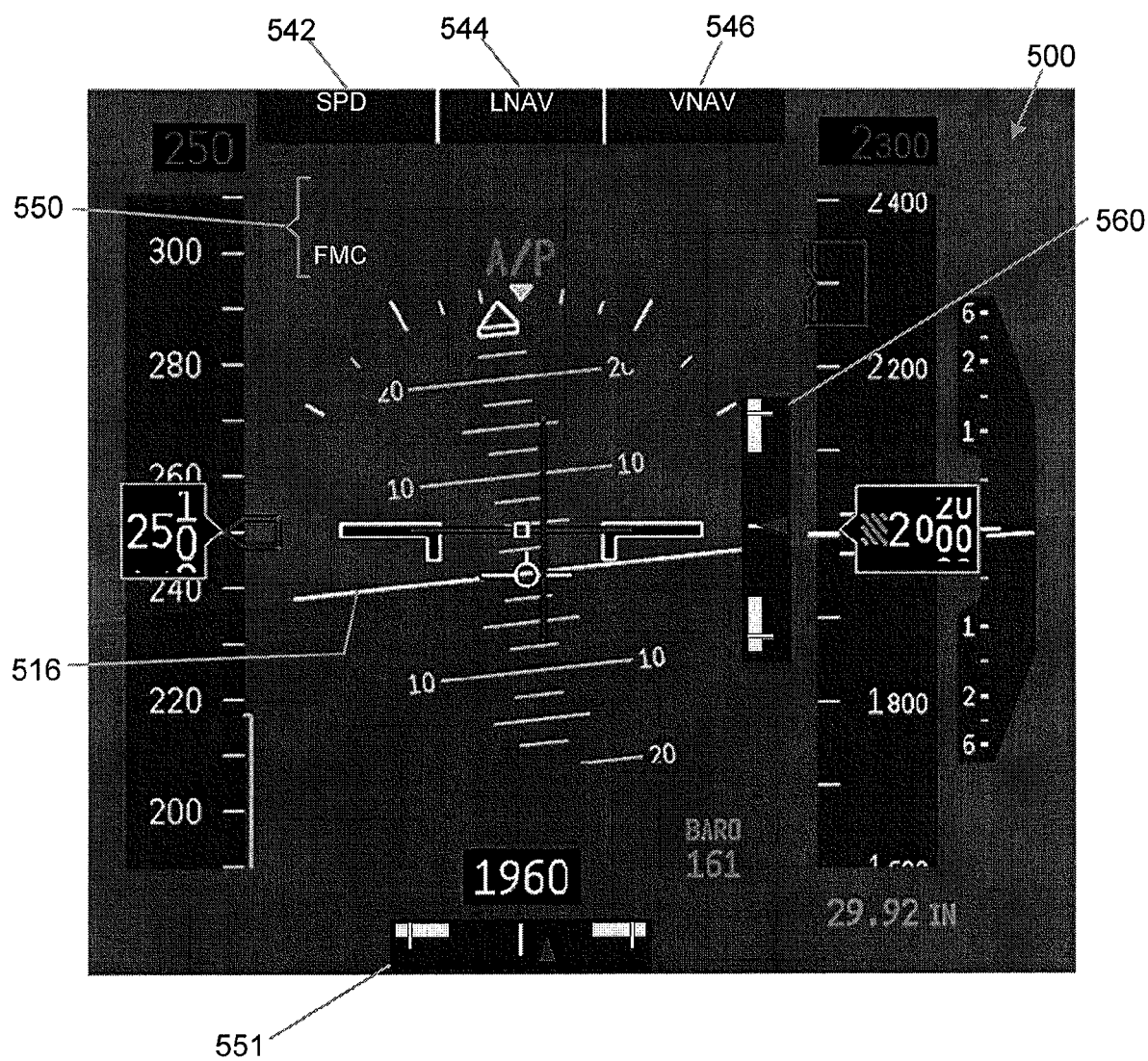
Figure 8:
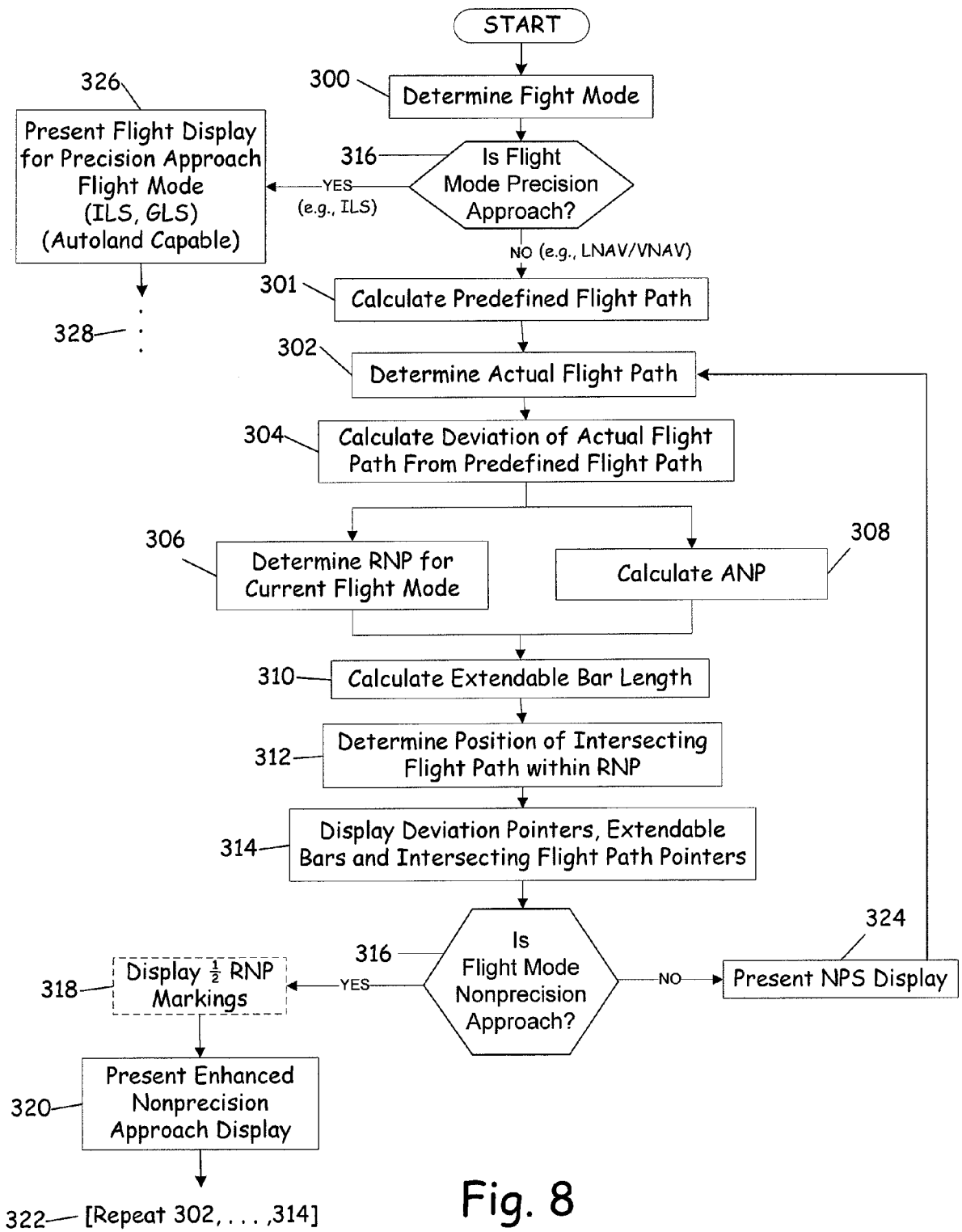

Having thus described the invention in general terms, reference will now be made to the accompanying drawings, which are not necessarily drawn to scale, and wherein:

FIG. 1 is a diagram illustrating the general appearance and relative interconnection of a flight management system;

FIG. 2 depicts an aircraft main instrument panel and its interconnecting relationship to the flight management computers, autopilot flight director system, flight control computers, interconnecting digital databuses, and CDUs;

FIGS. 3 and 4 illustrate an exemplary primary flight display including flight path deviation information and intersecting flight path information based on RNP and ANP navigation performance;

FIG. 5 illustrates an exemplary primary flight display for conventional integrated approach navigation (IAN) procedures;

FIG. 6 illustrates an exemplary primary flight display including flight path deviation information for non-precision approach flight modes and for non-precision landing flight modes based on RNP and ANP navigation performance according to one embodiment of the present invention;

FIG. 7 illustrates an exemplary primary flight display including flight path deviation information for non-precision, non-approach, non-landing flight modes based on RNP and ANP navigation performance according to one embodiment of the present invention; and FIG. 8 is a flow chart illustrating some of the operations of the method and computer program product for providing navigation performance based flight path deviation information and intersecting flight path information, according to one embodiment of the present invention.

DETAILED DESCRIPTION OF THE INVENTION

The present invention now will be described more fully hereinafter with reference to the accompanying drawings, in which some, but not all embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates a block diagram of the primary components of a typical modern commercial flight management system. Although the present invention can be used with the modern commercial flight management system, as discussed below, it should be understood, however, that the present invention could be implemented by any number of different electronic systems, including control displays for various other types of vehicles, without departing from the spirit and scope of the present invention. Shown at 32 is a conventional aircraft navigational Flight Management System-Control Display Unit (FMS-CDU). An FMS-CDU typically includes an electronic display capable of displaying lines of text entered by the flight crew. These lines of text depict, typically, waypoints along the path of a desired navigational route. Typically on both sides of and adjacent to the electronic display are line select keys. Upon the user activating one of the line select keys, the adjacent line of text on the electronic display is activated to thereby allow entry, selection, or deletion of text. An electronic display of an FMS-CDU typically also includes a scratch pad line capable of displaying system generated messages, entries via a keyboard and data being moved from one line to another. An FMS-CDU also typically includes a keyboard with an array of keys as well as control inputs by which the flight crew can manually enter waypoints, which then appear on the electronic display as text line items. Also included are various control keys which allow the flight crew to add, modify, and delete various entries.

Flight deck displays 73, including a navigation display, and FMS-CDU 32 may interconnect through a logic module indicated generally at 80. The logic module 80 includes the flight management computer (FMC) 82. In addition, the logic module 80 includes the display processor or computer (display module) 84. Inputs from the logic module 80 to and from the FMS-CDU 32 may be carried along multiple buses 86, whereas display information from the display processor 84 may be carried to the flight deck displays via a bus 88.

The FMC 82 provides lateral (LNAV) and vertical (VNAV) guidance signals to the autopilot flight director system (AFDS) 83, which validates and acknowledges the guidance signals. The AFDS then provides guidance signals to the flight control computers or Primary Flight Computer (PFC) 87 which activates the aircraft's control surfaces and devices 85 in a normal manner such that the aircraft is directed to automatically fly the route as selected by the FMC 82.

FIG. 2 illustrates a typical navigation arrangement as found in a modern commercial aircraft. Shown are left and right FMCs 102 and 104, respectively. The left and right FMCs communicate with associated left and right control display units (CDUs) 112, 114, respectively. The left and right CDUs are arranged for easy access by the pilots. As is often provided in modern commercial aircraft, a third, backup, or center channel CDU 120 may also be provided. The third CDU is used in some aircraft, such as the 777® family of aircraft manufactured by The Boeing Company, to interface to other aircraft systems such as satellite communications, SATCOM, and/or the public address/cabin interphone system (PACI).

The CDUs 112, 114 and 120 and FMCs 102, 104 may communicate over a triple redundant data link or bus 122A, B, C. The two FMCs 102, 104 may also communicate over an FMCs intercabinet bus 123, the function of which maintains synchronization of data states between the two FMCs.

In normal operation, one of the two FMCs 102, 104 assumes primary control, here identified as left FMC 102. Thus, outputs from FMC 102 are provided both to the main instrument panel 140 and to an autopilot flight director system 150. The main instrument panel includes left and right primary flight displays 142, 144, which are driven by left and right outputs from the autopilot flight director system 150. Left and right navigation displays 146, 148, respectively are driven by corresponding outputs from the primary FMC 102. A central engine and crew altering display 149 is also provided in the main instrument panel 140.

Flight crew entries into the left and right CDUs 112, 114 of desired flight plans are then transferred to the FMCs 102, 104, with corresponding graphical depiction of the flight plans set forth on the left and right navigation displays 146, 148.

Output navigation guidance signals for both vertical navigation VNAV and lateral navigation LNAV are provided from the primary FMC 102 to the autopilot flight director system 150.

The autopilot flight director system 150 then produces corresponding output signals which pass to the primary flight computers 160. The primary flight computers, in turn, produce appropriate control signals which are applied to the aircraft's flight control surfaces 170 to cause the aircraft to fly in accordance with the flight crew entered flight plan in the CDUs 112, 114.

FIGS. 3 and 4 are illustrative of an NPS display for LNAV/VNAV procedures, such as produced by the display processor 84, and suitably comprises a display field presented on an electronic display screen or display means, such as a cathode ray tube (CRT) screen, a liquid crystal display (LCD) screen, a plasma display screen, or like graphical display screen, often being sunlight-readable and having touch-screen functionality. Although the display can be produced by the display processor within the logic module 80, as discussed herein, it should be understood, however, that the display could be produced by any number of different electronic systems without departing from the spirit and scope of the present invention. Referring to FIG. 3, and the more conventional components of the display, the display field is divided into a number of indicators or indicating areas 200, 202, 204, 206 and 208. A first area 200 comprises a centrally located electronic attitude director indicator (ADI) which is substantially rectangular in shape having a central boresight box 210 representing the airplane longitudinal axis at the center of the box. On either side thereof are conventional, stationary aircraft symbols 212 and 214 representing wings of the aircraft. An artificial horizon is provided by line 216 separating an upper typically more lightly shaded area representing the sky and a lower typically darker area for ground shading. In addition, the lower portion of the attitude director indicator includes a digital readout 217 of the radio (or radar) altitude, which displays the current height of the aircraft above the ground. The overall presentation by the electronic attitude director indicator 200 is substantially conventional.

Adjacent and along the left side of attitude director indicator 200 is an air speed presentation 202 comprising a vertically oriented movable scale or "tape" having graduations representing air speed values along the right side thereof, i.e., on the side adjacent the attitude director indicator 200. The air speed indicator further includes a fixed pointer 218 which points inwardly toward the air speed scale as well as toward the center of the attitude director indicator. The pointer is provided with a window 220 digitally magnifying and indicating the air speed in response to instrumentation of the aircraft. As the air speed changes, the scale moves vertically relative to the pointer 218 which continues to point toward boresight box 210. The scale presents a range of speed values above and below the current speed, e.g., between 190 and 310 knots in FIGS. 3 and 4, with the numerics being disposed immediately to the left of the corresponding scale graduations. Portions of the scale above and below the viewable range are blanked from the presentation. Moreover, the scale is blanked at the location of window 220 which supplies the numerical readout of the current speed as a "rolling" number. The right edge of the scale is not obscured by pointer 218 or window 220.

The air speed indicator further includes a pilot controlled marker or "bug" 222 consisting of a pointer, with the current value of the selected air speed (e.g., 250 knots) being numerically displayed at location 224 above the air speed presentation. When the selected air speed is attained, the marker or "bug" will reach pointer 218. The marker 222 has a parked position at the upper end of the indicator 202 and at the lower end of indicator 202 when the selected air speed is outside the values depicted by the air speed scale, and at such time only one of the horizontal markers will appear at the end of the scale. The air speed indicator may also include a guidance speed band 225 to indicate an allowable range of air speeds accompanying the VNAV navigation guidance signal. In addition, the air speed indicator may include a reference target speed (REF) marker 251 along the indicator 202, and a selected landing flap position along with an associated reference speed, e.g., 30/120 in FIGS. 3 and 4.

At the bottom of the display, indicator 204 for aircraft heading comprises a raster-shaded area having the shape of a segment of a circle or compass rose. The indicator 204 is provided with a degree scale along the upper, arc-shaped portion thereof adjacent attitude director indicator 200, and like the previously described indicator 202, the scale of heading indicator 204 moves with respect to a fixed pointer 229. Below the fixed pointer 229, the indicator includes a track indicator 226 that moves as the track varies in relation to the heading. To the left of pointer 226 is a location 227 which digitally displays the present heading. For other than the segment of the heading display as illustrated in FIGS. 3 and 4, the compass rose is blanked out, and is also blanked at location 227 where the numeric readout is presented. However, neither pointer 229 nor track indicator 226 obscure the upper scale.

A further, vertically disposed indicator 206 is located adjacent the right side of attitude director indicator 200 in FIGS. 3 and 4, and is provided with an altitude scale along the left side thereof, i.e., on the side adjacent the attitude director indicator 200. The indicator 206 is further provided with altitude numerics to the right of appropriate indicia on the scale. The indicator is of the moving scale or moving tape type wherein the scale moves with respect to fixed pointer 228 as the altitude of the aircraft changes, with the current value of the selected altitude being numerically displayed at location 238 above the air speed presentation. Fixed pointer 228 includes an adjacent window within which the current altitude is digitally displayed in rolling number fashion. Thus, as altitude information from aircraft instrumentation changes, both the numerical indicia in window 230 and the position of the underlying scale change accordingly.

Altitude indicia for altitudes above and below the range depicted on the viewable scale, approximately eight hundred feet in FIGS. 3 and 4, are blanked, as is the scale beneath window 230. Pointer 228 and window 230 do not block the view of indicia along the left side of indicator 206, but point fixedly toward such indicia, and at the center of attitude director indicator 200. The altitude indicator 206 further includes a marker or "bug" which is pilot positionable along the left side of the scale. A box-like marker or bug 232 having a centrally inwardly directed pointer arrow 234 is pilot positionable along the left edge of the scale, with the pointer arrow 234 pointing at a desired altitude in slide-rule fashion. The digital readout at position 236 at the lower end of indicator 206 represents the barometric setting in inches of mercury.

The display of FIGS. 3 and 4 also includes a vertical speed indicator 208 calibrated in thousands of feet per minute along the left side thereof adjacent the right side of indicator 206. The area comprising indicator 208 is partially trapezoidal in shape, widening toward indicator 206, and is provided with a movable pointer 240 adapted to indicate the current vertical speed of the aircraft by pointing to the indicia of the scale along the left side of indicator 208. The scale of vertical speed indicator 208 is fixed in position. Pointer 240 is angularly movable from an apparent fixed origin at the right of the scale, from which the pointer 240 appears to extend radially outwardly, and terminating at the left side of the scale. Not only does pointer 240 point to indicia along the left side of fixed vertical speed scale of indicator 208, pointer 240 is also used to point toward a selected altitude on the altitude scale of indicator 206, here identified by the aforementioned marker or bug 232.

The display of FIGS. 3 and 4 also includes flight mode annunciator readouts 242, 244 and 246 at the top center of the display. The three columns are reserved for autothrottle status, lateral mode status and vertical mode status. It is noted these annunciations are arranged in an order which associates the column content to the display feature in closest proximity. In particular, autothrottle speed mode on the left (e.g., FMC SPD in FIGS. 3 and 4) is closest to the speed scale, vertical glide slope (or glide path) mode on the right (e.g., NVAV/PTH G/S in FIGS. 3 and 4) is closest to the altitude scale, and lateral localizer mode in the center (e.g., LNAV VOR/LOC in FIGS. 3 and 4) relates to the bank scale or heading indicator. Flight director, autopilot, and autoland status (or Autopilot/Flight Director System Status (AFDS)) annunciation is displayed at location 248 immediately above the center of the attitude director indicator 200. Location 250 may include approach reference characteristics, including station frequency and runway heading (in degrees), Distance Measuring Equipment (DME) readout in nautical miles, and the current source of the deviation scales displayed on the right side and bottom of the attitude director indicator 200, such as LNAV/VNAV in FIGS. 3 and 4.

Reference is now made to FIG. 4 and the navigation performance based flight path deviation and intersecting flight path information of the NPS display for LNAV/VNAV procedures. Located adjacent the bottom and right sides of the attitude director indicator 200, the display includes flight path scales corresponding to the lateral and vertical flight paths of the aircraft. The lateral flight path scale, which is displayed when LNAV or VNAV mode is active, includes a fixed reference point 252 representing the actual lateral flight path of the aircraft. The fixed reference point 252 is bounded by left 254 and right 256 end markers, which represent the Required Navigation Performance (RNP), discussed below. The reference point is centered between the end markers, which are equidistant from the reference point. Similarly, the vertical flight path scale, which is displayed when LNAV or VNAV mode is active, includes a fixed reference point 258 representing the actual vertical flight path of the aircraft. The fixed reference point 258 is bounded by top 260 and bottom 262 end markers which define the vertical RNP for the flight path of the aircraft.

Within the lateral flight path scale, the display includes a pilot and/or autopilot controlled marker or "bug" consisting of a lateral deviation pointer 264. The lateral deviation pointer represents the desired, predefined LNAV guidance flight path of the aircraft with respect to the actual lateral flight path. In this regard, the distance between the deviation pointer and the reference point represents the deviation of the aircraft with respect to the LNAV guidance flight path such that when the actual lateral flight path of the aircraft equals the LNAV flight path, the deviation will be zero. And when the deviation is zero, the deviation pointer will coincide with the reference point 252. Similarly, within the vertical flight path scale, the display includes a pilot and/or autopilot controlled marker or "bug" consisting of a vertical deviation pointer 266. The vertical deviation pointer represents the desired, predefined VNAV guidance flight path of the aircraft with respect to the actual vertical flight path.

Also within the lateral flight path scale, the display includes a representation of at least one extendable navigation uncertainty bar 268, 270, also referred to herein as ANP bars, in short. Although not illustrated, depending on the application and operation of the navigation system, the vertical flight path scale may similarly include vertical extendable bars representing the vertical navigation uncertainty. The lateral ANP bars extend from left end marker 254 and right end marker 256 toward the reference point 252 of the lateral flight path scale based upon the current capability of the aircraft's navigation system (i.e., ANP) in relation to the RNP. The width of the ANP bars are determined by the ratio of RNP to ANP, for example, as described in detail in U.S. Pat. No. 6,571,155, the content of which is hereby incorporated by reference in its entirety. For example, when RNP is relatively large, such as 1 nmi, and ANP is, e.g., 0.05 nmi, the width of the ANP bars may extend ½0th the distance between the end markers 254, 256 and the reference point 252, and when RNP is relatively small, such as 0.10 nmi, and ANP, e.g., remains 0.05 nmi, the width of the ANP bars may extend ½ the distance between the end markers 254, 256 and the reference point 252. Also, to improve the visibility and further alert the pilot and/or flight crew members of the presence of the ANP bars and displayed ANP/RNP relationship, ANP bars may include a projection beyond, or begin just outside, the RNP end markers. By extending, or positioning, the ANP bars in such a manner, even when an ANP/RNP relationship is such that the width of the ANP bars is very small, the presence of the ANP bars may still be apparent, and not visually blend into or be visually obscured by the RNP end markers. The area within (between) the ANP bars represents a navigation performance suspect region, while the area between the reference point 252 and the extendable bars 268, 270 represents a confidence region 276, or available Flight Technical Error (FTE), in which the aircraft is within the allowable deviation from the desired path and still maintaining an acceptable flight path. Because the ANP is dynamic and can vary with factors such as navigation sensor selection, aircraft system faults, external navigation aid failures and aircraft to navigation aid geometry, and because the RNP varies depending on the flight phase of the aircraft, the extendable bars extend and retract as the ANP and/or RNP vary.

In addition to ANP extendable position uncertainty bars, the lateral and vertical flight path scales may also include lateral and vertical intersecting flight path pointers 272, 274. The intersecting flight path pointers represent an intersecting flight path, such as an ILS path, within the RNP boundary of the end markers 254, 256, 260, 262. The intersecting flight path pointers 272, 274 are moveable along the respective flight path scale based upon a distance of the intersecting flight path from the actual flight path as indicated by actual flight position reference points 252, 258.

FIG. 5. illustrates a primary flight display for conventional integrated approach navigation (IAN) flight modes and procedures, also referred to herein as an IAN display. Particular features that distinguish the display of FIG. 5 from the display of FIGS. 3 and 4 are indicated with numerical references and described below. First, at location 350, the deviation scale ID is indicated as FMC, rather than LNAV/VNAV, and the approach data block resembles the approach data block of an ILS display for a precision (xLS) approach. Also, flight mode annunciator readouts 342, 344 and 346 at the top center of the display show different autothrottle status, lateral mode status, and vertical mode status indications. The autothrottle speed mode readout 342 on the left shows SPD, rather than FMC SPD. The vertical glide slope (or glide path) mode readout 346 on the right shows G/P, instead of VNAV PTH or G/S. And the lateral localizer mode readout 344 in the center shows FAC, instead of LNAV or VOR/LOC. The flight director, autopilot, and autoland status (or Autopilot/Flight Director System Status (AFDS)) annunciation shows FD at location 348, although CMD might also be displayed.

Located adjacent the bottom of the attitude director indicator at 351 and adjacent the right side of the attitude director indicator at 381, the IAN display includes flight path scales corresponding to the lateral and vertical flight paths of the aircraft. The lateral flight path scale at 351 corresponds to the localizer (LOC) measurements and includes a fixed reference point 352 representing the actual lateral flight path of the aircraft in relation to a lateral deviation pointer 364. The lateral deviation pointer 364 represents the desired, predefined LNAV guidance flight path of the aircraft with respect to the actual lateral flight path. In this regard, the distance between the lateral deviation pointer 364 and the reference point 352 represents a deviation of the aircraft from the desired, predefined LNAV guidance flight path. The fixed reference point 352 is bounded by left 354, right 356, mid-left 368, and mid-right 370 end markers. Similarly, the vertical flight path scale at 381 corresponds to the glideslope measurements and includes a fixed reference point 382 representing the actual vertical flight path of the aircraft in relation to a glideslope deviation pointer 394. The glideslope deviation pointer 394 represents the desired, predefined VNAV guidance flight path of the aircraft with respect to the actual glideslope flight path. In this regard, the distance between the glideslope deviation pointer 394 and the reference point 382 represents a deviation of the aircraft from the desired, predefined VNAV guidance flight path.

As noted previously, the NPS flight display of FIGS. 3 and 4 are only available before final approach procedures, i.e., before the flight display changes to an ILS, GLS, or IAN display for the final approach segment to a runway and during landing procedures. And, also as noted previously, unlike an NPS flight display, ILS, GLS, and, most notably, IAN displays, such as the IAN flight display in FIG. 5, do not provide deviation scales that depict the relationship between RNP and ANP. Thus, when a flight display changes from an NPS display to an ILS, GLS, or IAN display, the graphical depiction of the RNP/ANP relationship and deviation from the desired flight path is lost. Accordingly, embodiments of the present invention provide an enhanced IAN display that includes NPS-type deviation scales for LNAV/VNAV non-precision (non-xLS) approaches, including, for example, non-precision approaches using localizer (LOC), VHF omni-directional radio range (VOR), global positioning system (GPS), and/or area navigation (RNAV) capabilities. Embodiments of the present invention result in an NPS-like display that provides IAN approach methodology but using NPS-type deviation scales. Embodiments of the present invention may be employed, for example on new Boeing 787™ aircrafts and other aircrafts. And Boeing 777®, 747-8®, and 737®, aircrafts, as well as other aircrafts, may be retrofitted to provide embodiments of the present invention.

FIG. 6 is illustrative of a display according to an embodiment of the present invention. The display in FIG. 6 is an exemplary primary flight display for a non-precision approach flight mode, also referred to here in as an FMC-based, enhanced IAN-type non-precision approach display and more generically as an integrated approach navigation procedures display of an embodiment of the present invention. Like the display of FIG. 5, at location 450, the deviation scale ID is indicated as FMC, and the approach data block resembles the approach data block of an ILS display for a precision (xLS) approach. Also, flight mode annunciator readouts 442, 444 and 446 at the top center of the display show different autothrottle status, lateral mode status, and vertical mode status indications. The autothrottle speed mode readouts 442 on the left shows SPD. The vertical glide slope (or glide path) mode readout 446 on the right shows G/P. And the lateral localizer mode readout 444 in the center shows FAC. The flight director, autopilot, and autoland status (or Autopilot/Flight Director System Status (AFDS)) annunciation shows A/P at location 448, rather than FD shown in FIG. 5, although this flight mode annunicator (FMA) could similarly display FD, or CMD or NO AUTOLAND. Because the exemplary display of FIG. 6 is intended only for non-precision approach and landing flight modes and procedures, when the aircraft transitions from approach modes and procedures to landing modes and procedures, such as at 200 ft RA, the display at location 448 may change to NO AUTOLAND. This indicator is intended as another safeguard against a pilot forgetting that the aircraft is in a non-precision flight mode, and preventing the pilot from attempting an autoland procedure. Although an aircraft in a non-precision approach mode may perform autopilot procedures as would be indicated by A/P at location 448, autoland procedures and functionality are not available, must not be used, and must be disabled/disconnected for non-precision landing flight modes.

The exemplary primary flight display of FIG. 6 for non-precision approach flight modes and procedures, includes NPS-type flight path deviation scales 451, 460. Although included for both lateral and vertical deviations, the following description refers to the lateral flight path scale 451, and it is intended that the description correspond to similar features of the vertical deviation scale 460. The lateral flight path scale 451, like a conventional NPS-type deviation scale, includes a fixed reference point 452 representing the actual lateral flight path of the aircraft. The fixed reference point 452 is bounded by left 454 and right 456 end markers, which represent the Required Navigation Performance (RNP). The reference point 452 is centered between the end markers 454, 456, which are equidistant from the reference point 452. Within the lateral flight path scale 451, the display includes a pilot and/or autopilot controlled marker or "bug" consisting of a lateral deviation pointer 464. The lateral deviation pointer 464 represents the desired guidance flight path for the aircraft with respect to the actual lateral flight path. In this regard, the distance between the deviation pointer 464 and the reference point 452 represents the lateral deviation of the aircraft with respect to the lateral guidance flight path.

Also within the lateral flight path scale 451, the display includes a representation of at least one extendable navigation uncertainty bar 468, 470, also referred to herein as ANP bars, in short. The lateral ANP bars 468, 470 extend from left end marker 454 and right end marker 456 toward the reference point 452 of the lateral flight path scale 451 based upon the current accuracy of the aircraft's navigation system (i.e., ANP) in relation to the RNP. The widths of the ANP bars are determined by the ratio of RNP to ANP. Also, to improve the visibility and further alert the pilot and/or flight crew members of the presence of the ANP bars and displayed ANP/RNP relationship, ANP bars may include a projection beyond, or begin just outside, the RNP end markers. By extending, or positioning, the ANP bars in such a manner, even when an ANP/RNP relationship is such that the width of the ANP bars is very small, the presence of the ANP bars may still be apparent, and not visually blend into or be visually obscured by the RNP end markers. The area within (between) the ANP bars represents a navigation performance suspect region, while the area between the reference point 452 and the extendable ANP bars 468, 470 represents a confidence region, or available Flight Technical Error (FTE), in which the aircraft is within the allowable deviation from the desired path and still maintaining an acceptable flight path.

Unlike the display of FIG. 5, to alert the pilots and/or flight crew that the FMC has transitioned from a traditional NPS display for LNAV/VNAV flight modes and procedures to FMC-based, IAN-type non-precision (non-xLS) approach flight modes and procedures, the display may add ½ RNP markers 455, 457. The ½ RNP markers are added as a reference to aid the pilots and/or flight crew members. Although ½ RNP markers may be a preferred indicator, any fractional RNP marking or other predetermined fixed RNP marking, collectively referred to as "predetermined RNP markers," may be used to alert the pilots and/or flight crew that the FMC has transitioned from a traditional NPS display for LNAV/VNAV flight modes and procedures to FMC-based, IAN-type non-precision (non-xLS) approach flight modes and procedures. The transition to the enhanced IAN NPS-type display for the non-precision (non-xLS) approach also involves the FMC invoking available autopilot logic to provide lateral guidance and vertical glidepath flight controls and deviation alerting.

Like conventional IAN flight displays, embodiments of the present invention for enhanced IAN NPS-type flight displays continue to provide a distinctly different display for precision (xLS) and non-precision (non-xLS) approach types. As such, embodiments of the present invention may further reduce crew workload, standardize crew procedures, and enhance flight safety.

To improve the visibility and readability of all aspects of enhanced IAN NPS-type flight displays, and also to improve the visibility and readability of all aspects of NPS flight displays as illustrated in FIG. 7 by the exemplary improved NPS display according to an embodiment of the present invention for LNAV/VNAV flight modes, rather than having a small, central window for the attitude director indicator, as 200 in FIGS. 3 and 4, embodiments of the present invention display the attitude director indicator 400, 500 across the entire display screen with the lighter colored sky and darker colored ground areas extending behind all of the graphical features of the display screen. For example, the indicators or indicating areas 202, 204, 206 and 208 may be graphically presented in shadowed windows overlaying the lighter colored sky and darker colored ground areas of the attitude director indicator 400, 500. As such, the attitude director indicator 400, 500 has improved visibility and readability, particularly the greatly enlarged lighter colored sky area, darker colored ground area, and artificial horizon line 416, 516 separating the lighter colored sky and darker colored ground areas.

Also to improve the visibility and readability of the navigation performance based flight path deviation and intersecting flight path information, the NPS-type scales of enhanced IAN NPS-type flight displays, such the exemplary embodiment of FIG. 6, and NPS flight displays, such as the exemplary embodiment of FIG. 7, may be graphically presented in a shadowed window overlaying the graphical display of the attitude director indicator 400, 500, or added in a shadowed window below and beside the attitude director indicator 200 of a conventional NPS flight display as described with respect to FIGS. 3 and 4 and as described above with respect to indicators or indicating areas 202, 204, 206 and 208 being graphically presented in shadowed windows overlaying the lighter colored sky and darker colored ground areas of the attitude director indicator 400, 500.

Also to improve the visibility and readability of the navigation performance based flight path deviation and intersecting flight path information, the RNP end markers 454, 456 of embodiments of enhanced NPS flight displays and IAN NPS-type flight displays and ½ RNP markers 455, 457 of embodiments of enhanced IAN NPS-type flight displays may be graphically differentiated from the ANP extendable navigation uncertainty bars 468, 470. For example, the RNP end markers and ½ RNP markers (or other predetermined RNP markers) may be displayed in a first color and/or with a first brightness, and the ANP bars may be displayed in a second color and/or with a second brightness, including such benefit as to prevent the RNP end markers and ½ RNP markers and the ANP bars from graphically merging or blending together. For example, RNP end markers and ½ RNP markers may be a bright white, and ANP bars may be light gray. RNP end markers and ½ RNP markers may be further graphically differentiated from ANP bars by employing a layering effect, such as where the RNP end markers and ½ RNP markers are presented on top of or in front of the ANP bars, including such benefit as to prevent the ANP bars from obscuring or partially obscuring the RNP end markers and ½ RNP markers (or other predetermined RNP markers).

Reference is now made to FIG. 8, which is exemplary of a method of utilizing an embodiment of the present invention. According to the method, when the air crew desires to fly a desired flight plan, the air crew, or FMC, initially determines the flight mode (300). If the flight mode is determined to be for a precision approach (316) following YES arrow to block 326, the display processor 84 presents a flight display for the precision approach flight mode, such as ILS or GLS, with autoland capabilities, and the process continues according to conventional precision approach flight mode procedures, as indicated at 328. If the air crew does not desire to fly a precision approach, the NO arrow is followed to block 301, thereby utilizing LNAV and/or VNAV guidance. The primary FMC calculates the predefined flight path according to the desired flight plan and outputs navigation guidance signals for vertical navigation VNAV and/or lateral navigation LNAV, and transmits the LNAV and/or VNAV signals to the autopilot flight director system, as indicated at 301.

To determine the deviation of the actual flight path of the aircraft with respect to the desired flight path, the actual flight path of the aircraft is continuously acquired, such as by the FMCs 102, 104, using position sensor information, such as from a GPS (Global Positioning System), an IRS (Inertial Reference System) and a ground-based radio system, as indicated at 302. From the actual flight path and the predefined flight path, the deviation of the aircraft from the predefined flight path can be continuously calculated, which is typically accomplished by the primary FMC and thereafter transmitted to the display processor 84, as indicated at 304. Typically, the deviation is transmitted to the display processor as lateral and vertical errors in nautical miles lateral and in feet vertical, which the display processor continuously translates to position the deviation pointers.

After the deviation of the aircraft has been calculated, or as the deviation of the aircraft is being calculated, the RNP and ANP for the aircraft are continuously determined. The RNP for the current flight phase is determined, typically in the FMCs 102, 104 by using an internal database of predetermined RNP values, as indicated at 306. For example, an aircraft flying in an enroute flight phase might have a predetermined RNP value of 4.0 nm, while an aircraft flying in the terminal area might have an RNP of 1.0 nm. Additionally, or alternatively, the RNP for the current flight phase can be manually inputted into the FMS-CDU 32 or it can be determined by the FMC from the value specified in the navigation database for the selected procedure. The ANP is calculated, typically by the primary FMC, according to factors such as navigation aid performance characteristics and aircraft geometry, as such is known to those skilled in the art, as indicated at 308. The FMC continuously determines the RNP and ANP based upon the current flight phase of the aircraft and the instantaneous navigation performance of the aircraft, and thereafter transmits the RNP and ANP values to the display processor 84.

After the RNP and ANP are determined, typically after the display processor 84 receives the RNP and ANP values, the length of the extendable ANP bars 468, 470 are continuously calculated, such as by the display processor. While the length of the extendable bars can be calculated according to any of the methods described above, the length of the extendable bars are typically calculated relative to the allowable FTE according to the approximation method above for determining the length of the confidence region 276, as indicated at 310.

In addition to determining the length of the extendable ANP bars 468, 470, intersecting flight paths that are within the RNP, such as runway approach paths, can be determined, such as by the display processor 84. In this regard, the display processor continuously receives information regarding intersecting flight paths within the RNP of the aircraft, such as from other aircraft guidance systems including the Instrument Landing System (ILS), the Microwave Landing System (MLS) and the Global Navigation Satellite System Landing System (GLS), as indicated at 312. After receiving the information regarding intersecting flight paths, the display processor can translate the distance relative to the predefined flight path to determine the position of the intersecting flight path pointers.

Once the display processor 84 made all necessary calculations and determinations, the display processor displays the deviation pointers 464, extendable ANP bars 468, 470, and intersecting flight path pointers on the respective lateral and vertical flight path scales, as indicated at 314. Whereas the flight path scales including the deviation pointers, extendable ANP bars, and intersecting flight path pointers can be displayed in any of a number of locations on the aircraft, in a preferred embodiment the flight path scales including the deviation pointers, extendable bars and intersecting flight path pointers are displayed on the primary flight displays 142, 144 of the aircraft. As the aircraft deviation, the ANP and/or RNP, or the distance of intersecting flight paths change, the FMC and display processor continuously operate to alter the display accordingly.

While the display process makes a decision at 316 whether the flight mode is a precision approach, thereby excluding further processing to provide flight path scales presenting ANP/RNP relationships, at 316, a determination must also be made as to whether the flight mode is a non-precision approach. If the flight mode is not for a non-precision approach, an NPS display is provided, or continues to be provided as the case may be, at 324, and the process returns to repeat steps 302 through 316. As long as the aircraft is not flying an approach, the system will continue to present an NPS display, as indicated at 324. But if at step 316 a determination is made that the aircraft is in a non-precision approach flight mode, following the YES arrow to 318, ½ RNP markings (or other predetermined RNP markers) will be added between the actual flight path reference pointer and RNP end markers. An enhanced non-precision approach display is presented for performing the non-precision approach procedures, as indicated at 320. And to continue representing the ANP/RNP relationships, steps 302 through 314 are repeated, as indicated at 322. The steps of FIG. 8 discussed above are typically performed by an FMC 82, and in part in coordination with a display processor 84 and flight deck displays 73 to effectuate the presentation of display to a user.

Although not indicated in FIG. 8, if the aircraft switches from a non-precision flight mode to a precision approach, such as after the aircraft intersects an ILS flight path, the display will change from either an NPS display or an enhanced non-precision approach display, depending upon the current flight mode, to a precision approach display, in like manner as indicated at 326.

In various advantageous embodiments, portions of systems and methods of the present invention, such as the display processor, may include a computer program product. A computer program product for providing navigation performance based flight path deviation and/or intersecting flight path information for non-precision flight modes includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as FMC 82 as depicted in FIG. 1.

In this regard, FIGS. 1 and 8 are block diagram, flowchart and control flow illustrations of methods, systems, and computer program products according to embodiments of the invention. It will be understood that each block or step of the block diagram, flowchart and control flow illustrations, and combinations of blocks in the block diagram, flowchart and control flow illustrations, may be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart and control flow illustrations support combinations of means for performing the specified functions, combinations of steps for performing the specified functions, and computer program instruction means for performing the specified functions. It will also be understood that each block or step of the block diagram, flowchart and control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

The present invention therefore provides systems, computer program products, and methods for displaying navigation performance based flight path deviation information during the final approach segment to a runway and during landing of non-precision flight modes are provided. Improved graphical depictions of navigation performance based flight path deviation information provide pilots and flight crew members with clear, concise displays of the dynamic relationship between ANP and RNP, mode and aspect of flight and related procedures, intersecting flight paths, and current actual flight path deviation from a predefined flight path during the final approach segment to a runway and during landing. For example, an enhanced IAN display may include NPS-type deviation scales to show RNP/ANP relationships and ½ RNP markers (or other predetermined RNP markers) to alert the pilots and flight crew members that the FMC has transitioned from an NPS display for RNAV (LNAV/VNAV) flight procedures to an enhanced IAN display for a non-precision (non-xLS) approach and/or landing.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of providing navigation performance based flight path deviation information for non-precision approach flight modes for an aircraft comprising:
providing at least one non-precision approach procedures display during the non-precision approach flight modes for aircraft landing approach;
providing at least one of a lateral and vertical flight path scale on the non-precision approach procedures display, wherein each flight path scale on the non-precision approach procedures display comprises a reference point bounded by end markers extending in at least one of a lateral and vertical direction, respectively, wherein the reference point relates to an actual flight path, and wherein the end markers represent a required navigation performance (RNP);
determining a deviation of the actual flight path of the aircraft relative to a predefined flight path and thereafter displaying at least one moveable deviation pointer on the at least one flight path scale on the non-precision approach procedures display based upon the deviation and the reference point; and
determining an actual navigation performance (ANP) and the RNP based upon a flight phase of the aircraft and thereafter displaying a representation of at least one extendable navigation uncertainty bar on the at least one flight path scale on the non-precision approach procedures display based upon the ANP and RNP, wherein the representation extends from at least one of the end markers toward the reference point of the at least one flight path scale on the non-precision approach procedures display to thereby define at least one navigation performance suspect region of the non-precision approach procedures display.

2. The method according to claim 1, further comprising providing a deviation pointer representing the deviation of the aircraft from a desired flight path and positioned in relation to the position of the actual flight path pointer.

3. The method according to claim 1, further comprising providing at least one marker indication of a predetermined RNP location on the at least one flight path scale on the non-precision approach procedures display between the reference point and one of the end markers during non-precision approach flight modes.

4. The method according to claim 1, further comprising presenting an indication of no autoland procedures during landing flight modes.

5. The method according to claim 1, further comprising generating an alert for exceeding at least one of a predefined lateral navigation deviation and a predefined vertical glidepath deviation of the aircraft from a desired flight path.

6. The method according to claim 1, further comprising identifying at least one intersecting flight path and, thereafter, displaying at least one moveable intersecting flight path pointer on the at least one flight path scale based upon a distance of the intersecting flight path from the actual flight path.

7. The method according to claim 1, further comprising:
providing a non-precision, non-approach, non-landing procedures display during non-precision, non-approach, non-landing flight modes;
providing an attitude director indicator on the non-precision, non-approach, non-landing procedures display;
providing at least one of a lateral and vertical flight path scale on the non-precision, non-approach, non-landing procedures display, wherein each flight path scale on the non-precision, non-approach, non-landing procedures display comprises a reference point bounded by end markers extending in at least one of a lateral and vertical direction, respectively, wherein the reference point relates to an actual flight path, and wherein the end markers represent a required navigation performance (RNP);
determining a deviation of the actual flight path of the aircraft relative to a predefined flight path and thereafter displaying at least one moveable deviation pointer on the at least one flight path scale on the non-precision, non-approach, non-landing procedures display based upon the deviation and the reference point; and
determining an actual navigation performance (ANP) and the RNP based upon a flight phase of the aircraft or from the navigation database and thereafter displaying a representation of at least one extendable navigation uncertainty bar on the at least one flight path scale on the non-precision, non-approach, non-landing procedures display based upon the ANP and RNP, wherein the representation extends from at least one of the end markers toward the reference point of the at least one flight path scale on the non-precision, non-approach, non-landing procedures display to thereby define at least one navigation performance suspect region.

8. A method according to claim 7, wherein the at least one flight path scale on the non-precision, non-approach, non-landing procedures display is presented in a semi-transparent shadow box on top of the attitude director indicator.

9. A method according to claim 7, wherein the representation of the at least one extendable navigation uncertainty bar begins at a position further than at least one of the end markers from the reference point and extends toward the reference point of the at least one flight path scale on the non-precision, non-approach, non-landing procedures display to thereby define the at least one navigation performance suspect region.

10. A method according to claim 7, wherein the representation of the at least one extendable navigation uncertainty bar is graphically presented as being positioned behind the at least one of the end markers.

11. A computer program product for providing navigation performance based flight path deviation information for non-precision approach flight modes for an aircraft, the computer program product comprising a computer-readable storage medium having computer-readable program code portions stored therein, the computer-readable program code portions comprising:
a first program code portion for providing at least one non-precision approach flight display during the non-precision approach flight modes for aircraft landing approach;
a second program code portion for providing at least one of a lateral and a vertical flight path scale on the non-precision approach flight modes, wherein each flight path scale comprises a reference point bounded by end markers extending in at least one of a lateral and vertical direction, respectively, wherein the reference point relates to an actual flight path, and wherein the end markers represent a required navigation performance (RNP);

a third program code portion for determining a deviation of the actual flight path of the aircraft relative to the predefined flight path and thereafter displaying at least one moveable deviation pointer on the at least one flight path scale based upon the deviation; and a fourth program code portion for determining an actual navigation performance (ANP) and the RNP based upon a flight phase of the aircraft and thereafter displaying a representation of at least one extendable navigation uncertainty bar on the at least one flight path scale based upon the ANP and RNP, wherein the representation extends from at least one of the end markers toward the reference point of the at least one flight path scale to thereby define at least one navigation performance suspect region.

12. The computer program product according to claim 11, further comprising a fifth program code portion for providing at least one marker indication of a predetermined RNP location on the at least one flight path scale between the reference point and one of the end markers during non-precision approach flight modes.

13. The computer program product according to claim 11, further comprising a fifth program code portion for presenting an indication of no autoland procedures during landing flight modes.

14. The computer program product according to claim 11, further comprising a fifth program code portion for generating an alert for exceeding at least one of a predefined lateral navigation deviation and a predefined vertical glidepath deviation of the aircraft from a desired flight path.

15. The computer program product according to claim 11, further comprising a fifth program code portion for providing an instrument landing system display during at least one of a precision approach flight mode and a precision landing flight mode.

16. The computer program product according to claim 11, further comprising a fifth program code portion for identifying at least one intersecting flight path and, thereafter, displaying at least one moveable intersecting flight path pointer on the at least one flight path scale based upon a distance of the intersecting flight path from the actual flight path.

* * * * *